United States Patent [19]

Roerig

[11] Patent Number: 5,534,117
[45] Date of Patent: Jul. 9, 1996

[54] POSITION CONTROL FOR SELF-LOADING ROLL

[75] Inventor: Arnold J. Roerig, Gold Canyon, Ariz.

[73] Assignee: Beloit Technologies, Inc., Wilmington, Del.

[21] Appl. No.: 489,018

[22] Filed: Jun. 8, 1995

Related U.S. Application Data

[63] Continuation of Ser. No. 293,978, Aug. 22, 1994, Pat. No. 5,447,605.

[51] Int. Cl.$^6$ .................. D21F 3/08; D21F 3/00; B21B 29/00
[52] U.S. Cl. .................. 162/358.3; 162/358.1; 492/7; 492/2; 492/20
[58] Field of Search .................. 162/358.1, 358.3, 162/272; 492/71, 6, 2, 20

[56] References Cited

U.S. PATENT DOCUMENTS

| | | | |
|---|---|---|---|
| 3,802,044 | 4/1974 | Spillmann et al. | 29/113 |
| 3,885,283 | 5/1975 | Biondetti | 29/116 |
| 4,319,389 | 3/1982 | Marchioro | 29/116 |
| 4,328,744 | 5/1982 | Pav et al. | 100/162 |
| 4,357,743 | 11/1982 | Hefter et al. | 29/116 |
| 4,605,366 | 8/1986 | Lehmann et al. | 425/143 |
| 4,776,069 | 10/1988 | Snellman | 29/116.1 R |
| 4,796,525 | 1/1989 | Schiel et al. | 100/93 |
| 4,815,183 | 3/1989 | Bondetti | 29/116 |
| 4,858,292 | 8/1989 | Bühlmann et al. | 29/116 |
| 4,941,250 | 7/1990 | Küsters | 29/116 |
| 5,076,891 | 12/1991 | Link et al. | 162/206 |
| 5,286,245 | 2/1994 | Schiel | 492/7 |

FOREIGN PATENT DOCUMENTS

| | | |
|---|---|---|
| 2230139 | 1/1973 | Germany . |
| 2254392 | 5/1974 | Germany . |
| 2849253 | 5/1980 | Germany . |
| 3026865 | 8/1981 | Germany . |

*Primary Examiner*—Donald E. Czaja
*Assistant Examiner*—Jose A. Fortuna
*Attorney, Agent, or Firm*—Dirk J. Veneman; Raymond W. Campbell; David J. Archer

[57] ABSTRACT

A hydraulic crown support system employs a stationary cross head mounted within a cylinder or beneath an extended nip shoe. Individual hydraulic pistons are disposed along the stationary cross head, which, under the force of hydraulic pressure, support the inner wall of a roll or an extended nip shoe. The displacement of the support cylinders is controlled through one or more adjustable ports formed in the sidewall of the hydraulic cylinder or cylinders which support the roll or extended nip shoe. With a piston which extends from one end of the stationary cross head to the other, some tilting from one side to the other of the cross head can be achieved by the adjustment of the pressure ports, thus compensating for misalignment in the vertical direction between an extended nip or crown-controlled roll.

8 Claims, 5 Drawing Sheets

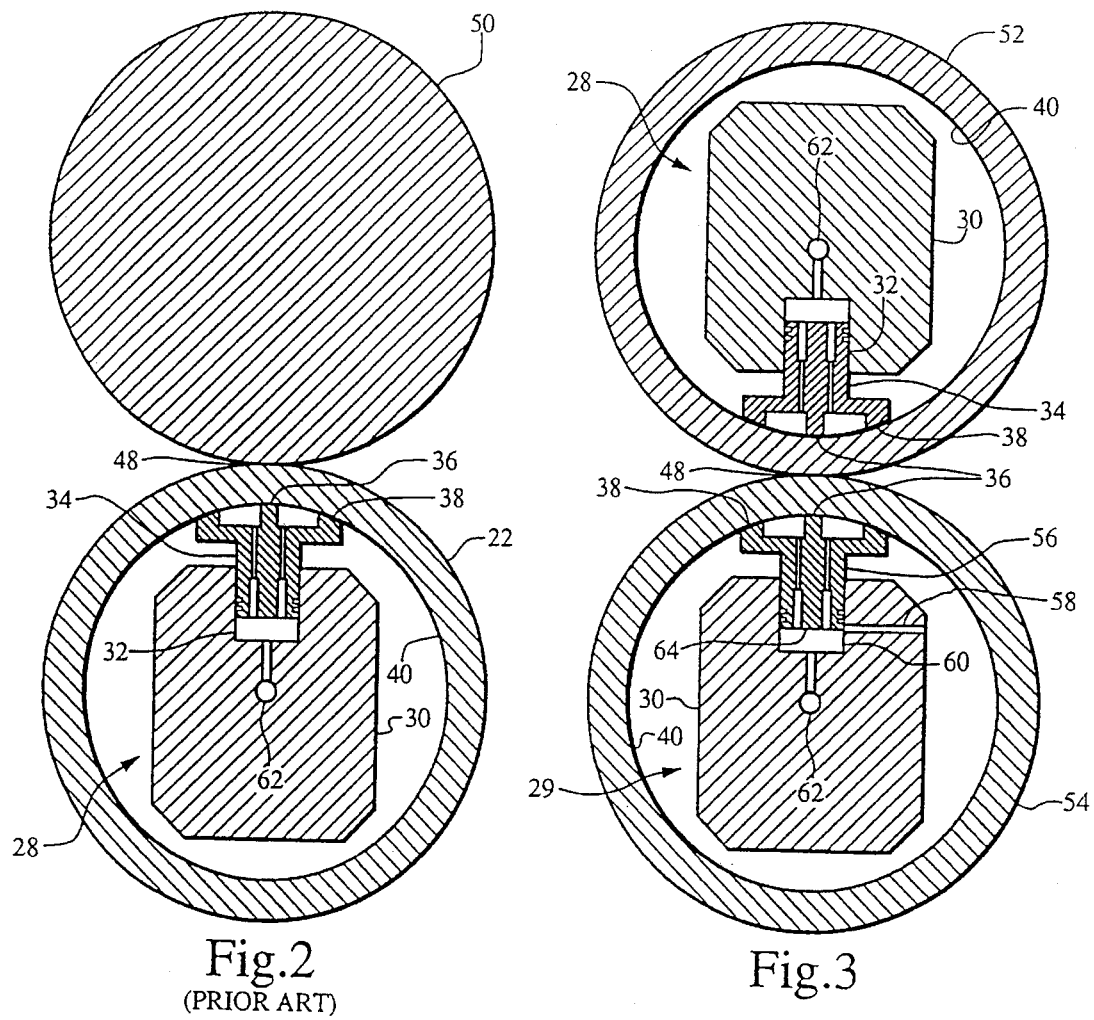

POSITION CONTROL FOR SELF-LOADING ROLL

This is a divisional of Ser. No. 08/293,978 filed on Aug. 22, 1994, now U.S. Pat. No. 5,447,605.

FIELD OF THE INVENTION

The present invention relates to crown control in rolls and extended nip presses in general. More particularly, the present invention relates to apparatus for crown control utilizing supporting hydraulic cylinders.

BACKGROUND OF THE INVENTION

The manufacture of paper involves many steps where the paper web is run between a nip formed between two rolls or between a roll and a shoe of an extended nip press. The purpose of a nip between rolls, or between a roll and a shoe, is to exert pressure on the paper web. Because modern paper manufacturing machines are up to four-hundred inches or more wide, loading the ends of the rolls fails to produce a uniform pressure across the nip formed between the rolls.

One solution to this problem is to form a gradually increasing crown on the roll surface. This crown is in the form of a gradual increase of diameter of the roll toward the center. When a crowned roll is combined with a straight roll or another crowned roll, and the ends of the opposed rolls are brought together, a uniform pressure can be produced across the entire length of the rolls.

A problem associated with crowned rolls is that the rolls only develop a uniform pressure at one selected loading. Thus, as it is often desirable to change the compressive loading depending on the type and thickness of the paper being produced, forming a crowned profile on the rolls is a less than optimal solution.

Another method of crown control involves placing a non-rotating support beam in the center of an outer rotating shell which forms the roll. The support beam supports one long piston, or a number of discrete hydraulic pistons, which engage the inner surface of the roll within the roll in proximity to the nip and force the roll against an opposed roll. Although this method effectively forms a nip of uniform pressure across the length of the roll, the process results in continuous flexure of both rolls, which can lead to fatigue failure in the rolls. Further, with non-ductile materials, such as a granite roll, any flexure in the roll rapidly causes roll deterioration.

This flexure of the rolls can be overcome by employing two self-loading hydraulic crown control systems, one in each opposed roll. Then both rolls have internal, non-rotating support beams and hydraulic cylinders with sliding shoes which engage inside surfaces of the rolls opposite the nip and are free to move in the radial direction in line with the nip plane. The pistons support each crown of the rolls and produce a uniform pressure without deflection of either roll.

In practice, however, the equilibrium is unstable. If either one of the crown support systems has a slightly higher hydraulic pressure or loading, it will tend to cause movement of one roll against the other until one hydraulic cylinder or the other bottoms out. Thus, some form of control system is required for the crown support hydraulic pistons.

German Patent No. 22 30 139 discloses a transversely controlled, hydraulically supported roll in which several supporting pistons are arranged in a row on the cross head along the side of the roller adjacent the nip. Each piston can be independently pressurized with pressure fluid. In this manner, the supporting pistons function to provide predetermined counteracting force that acts against the inner surface of the cylinder to produce a specificline pressure distribution, whereby the cross head, under the influence of the counteracting force, can bend inside the cylinder.

Other patents which include methods for controlling individual cylinders in a crown control support system include German Patent Nos. 22 54 392, 28 49 253, and 30 26 865.

In addition to being costly, crown control via valves controlling pressure to individual cylinders involves controlling the pressures in lines to the support cylinders by means of control valve arrangements. Therefore, the safe operation of these apparatus can only be as effective as the operability of the valve arrangement they employ.

U.S. Pat. No. 4,941,250 discloses a method of controlling the position of individual support pistons in a crown control support system by providing a pressure venting port. Said patent discloses positioning the cylinder by a reliable means, via a single conduit which may be formed by a hole cut out in the upper wall portion of the piston recess, or by an oblique drilled duct. However, while such methods provide high reliability, they require predetermination in the fabrication of the crown supported roll system as to where each piston needs to be positioned, presenting some of the same problems presented by a roll with a machined crowned surface, i.e.: the design lacks adaptability and adjustability in positioning of the crown support.

What is needed is a hydraulic crown support mechanism which is adjustable and reliable in operation.

SUMMARY OF THE INVENTION

The self-loading hydraulic crown support system of this invention employs a stationary cross-head mounted within a cylinder or beneath an extended nip shoe. Individual hydraulic pistons are disposed along the stationary cross-head, which, under the force of hydraulic pressure, support the inner wall of a roll or an extended nip shoe. The displacement of the support cylinders is controlled through multiple or adjustable ports formed in the sidewall of the hydraulic cylinder or cylinders which support the roll or extended nip shoe.

With a piston which extends from one end of the stationary cross-head to the other, some tilting from one side to the other of the cross-head can be achieved by the adjustment of the pressure pods, thus compensating for a certain amount of misalignment in the vertical direction between an extended nip or crown controlled roll.

It is an object of the present invention to provide a self-loading crown control system which can be utilized with a granite roll.

It is another object of the present invention to provide a crown control mechanism which positions the crown control piston or pistons at a fixed location, but which provides for the adjustment of that location.

It is a still further object of the present invention to provide a crown control positioning system of increased reliability.

Further objects, features, and advantages of the invention will be apparent from the following detailed description when taken in conjunction with the accompanying drawings.

BRIEF DESCRIPTION OF THE DRAWINGS

FIG. 2 is a schematic cross-sectional view of a prior art self-loading crown control system.

FIG. 3 is a somewhat schematic cross-sectional view of two self-loading crown control rolls forming a nip and employing the position control apparatus of this invention.

DESCRIPTION OF THE PREFERRED EMBODIMENT

Figure 1:
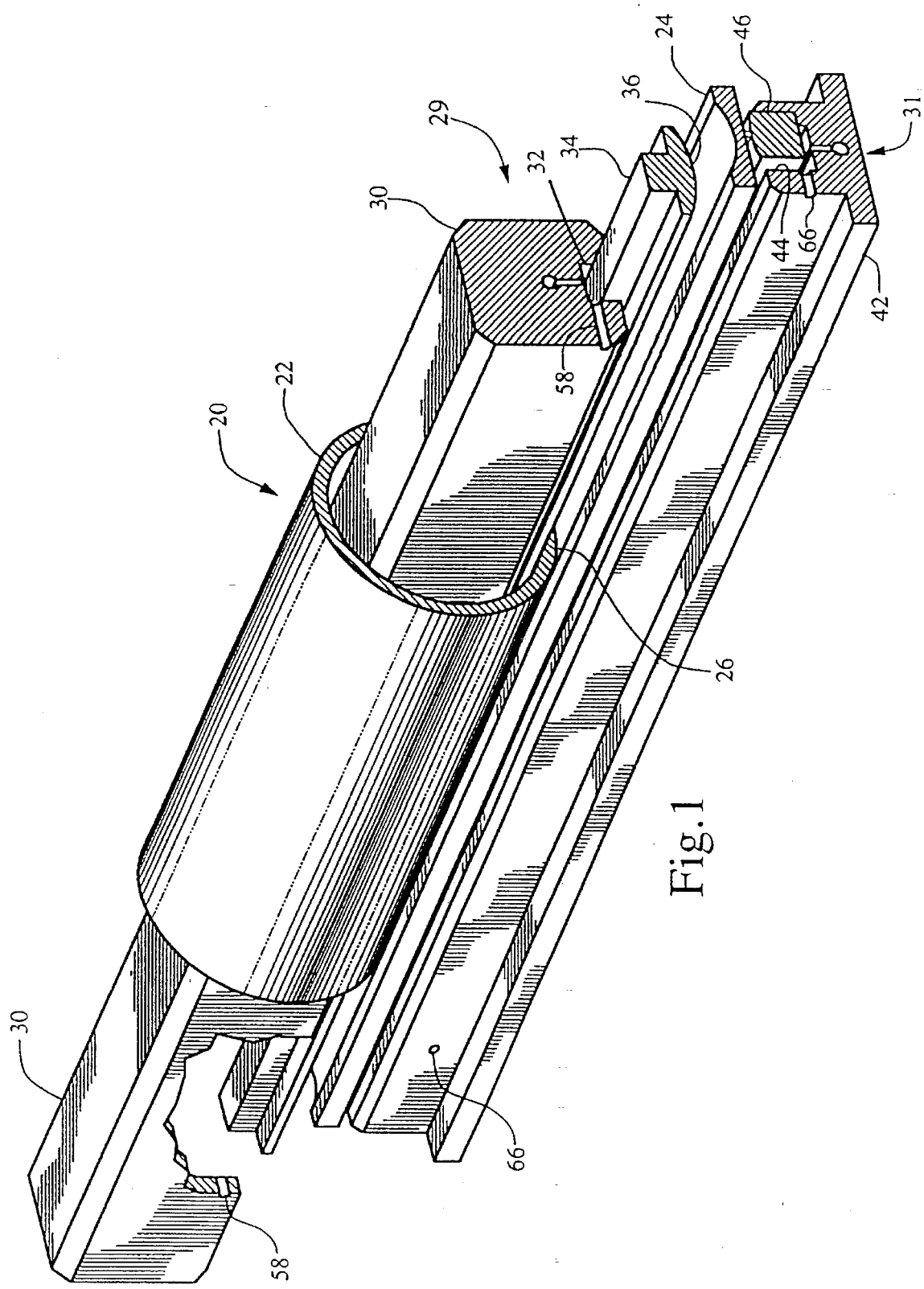
FIG. 1 is an isometric view, partly broken away in section of a self-loading crown supported backing roll and extended nip press, employing the position control of this invention wherein the shoe blanket and felt have been omitted for clarity.

Referring more particularly to FIGS. 1–8, wherein like numbers refer to similar parts, an extended nip press 20 of the present invention having a single piston is shown in FIG. 1.

The extended nip press 20 has a cylindrical backing roll 22 which engages with a concave shoe 24 to form an extended nip 26. The shoe blanket and related apparatus has been omitted from the figures for clarity. The backing roll 22 has a crown support system 29 which includes a stationary cross-head 30 which extends within and supports the backing roll 22. The cross-head 30 has a piston chamber known as a cylinder 32 which is a downwardly opening channel formed in the cross-head facing the nip 26. A piston 34 is positioned within this cylinder for movement toward and away from the inside surface 40 of the backing roll 22, spaced above the nip 26. The piston 34 has a nip facing surface 36. As shown in FIG. 3, the nip facing surface 36 rides on a film of hydraulic fluid 38 which allows the piston 34 to ride on the inside surface 40 of the backing roll without significant friction.

The shoe 24 which forms the extended nip 26 has a nip support system 31 which includes a lower stationary cross-head 42. The cross-head 42, similar to the cross-head 30 of the backing roll, has an extended channel defining a piston cylinder 44 which supports a piston 46 which supports the shoe 24.

In a prior art system, as shown in FIG. 2, a nip 48 is formed between an unsupported roll 50 and the crown supported roll 22. In the configuration of FIG. 2, the unsupported roll 50 will resiliently deflect under load from the opposing roll 22. Part of the crown support system 28 operates to load the inside surface 40 of the backing roll 22 such that the backing roll will conform itself to the unsupported roll 50. Roll 22 can be a self-loading roll or a non-self-loading roll.

The situation is complicated, as shown in FIG. 3, where two self-loading crown support systems are employed on opposite sides of the nip 48.

In FIG. 2, the unsupported roll 50 and the backing roll 22 both experience deflection along their length as the unsupported roll 50 deflects under load and the backing roll 22 under support from the piston 34 conforms to the deflected shape of the backing roll 50. However, in many circumstances, particularly where the rolls are constructed of a brittle material such as granite, it is desirable to prevent all flexure in two rolls being used to form a nip.

The obvious solution of using two self-loading crown control rolls in opposition to each other failed because the system is in unstable equilibrium. If the upper backing roll 52 in FIG. 3 is pressed by a piston 34 against the lower backing roll 54, the support piston 56 may balance by loading between the upper roll 52 and the lower roll 54. However, the equilibrium is unstable in that if one of the pistons 34, 56 pushes a little bit harder than the other, the rolls continue to deflect until one piston bottoms out. This is highly undesirable and can result in large deflections of the rolls 52, 54. Bottoming out can cause the rolls to crash into the cross-heads 30 or, in the case of a granite roll, to destroy the roll 52, 54 itself.

The solution of the present invention, as shown in FIG. 3, is to use a position control system 29 to control the position of one of the pistons. The control system 29 of this invention is employed with the lower piston 56. The control system 29 provides an opening or port 58 formed in the cross head 30 which discharges from the cylinder 60. The port is positioned toward the bottom of the cylinder 60, and is thus blocked when the piston 56 is low within the cylinder. When the piston 56 is elevated beyond a desired level hydraulic fluid being supplied by the hydraulic fluid source 62 vents from the cylinder 60 through the uncovered port 58. Hydraulic fluid leaking through the port 58 will prevent further extension of the piston 56.

It is known to use such venting ports to stabilize a multiplicity of cylinders and pistons along the length of a cross-head which is supporting a backing roll. FIG. 1 illustrates how such a system can be used not only to control the stroke of the piston 34, but also to tilt the piston 34 with respect to the cylinder 32 by ports 58 on either end of the cylinder, thus controlling the cross-machine angle of the backing roll 22. Similarly the ports 66 in the extended nip press cylinder 44 control the cross-machine angle of the shoe 24. It should be understood that position control would not normally be used to support both the roll 22 and the shoe 24, both types of support are shown in FIG. 1 for illustrative proposes only.

Figure 4:
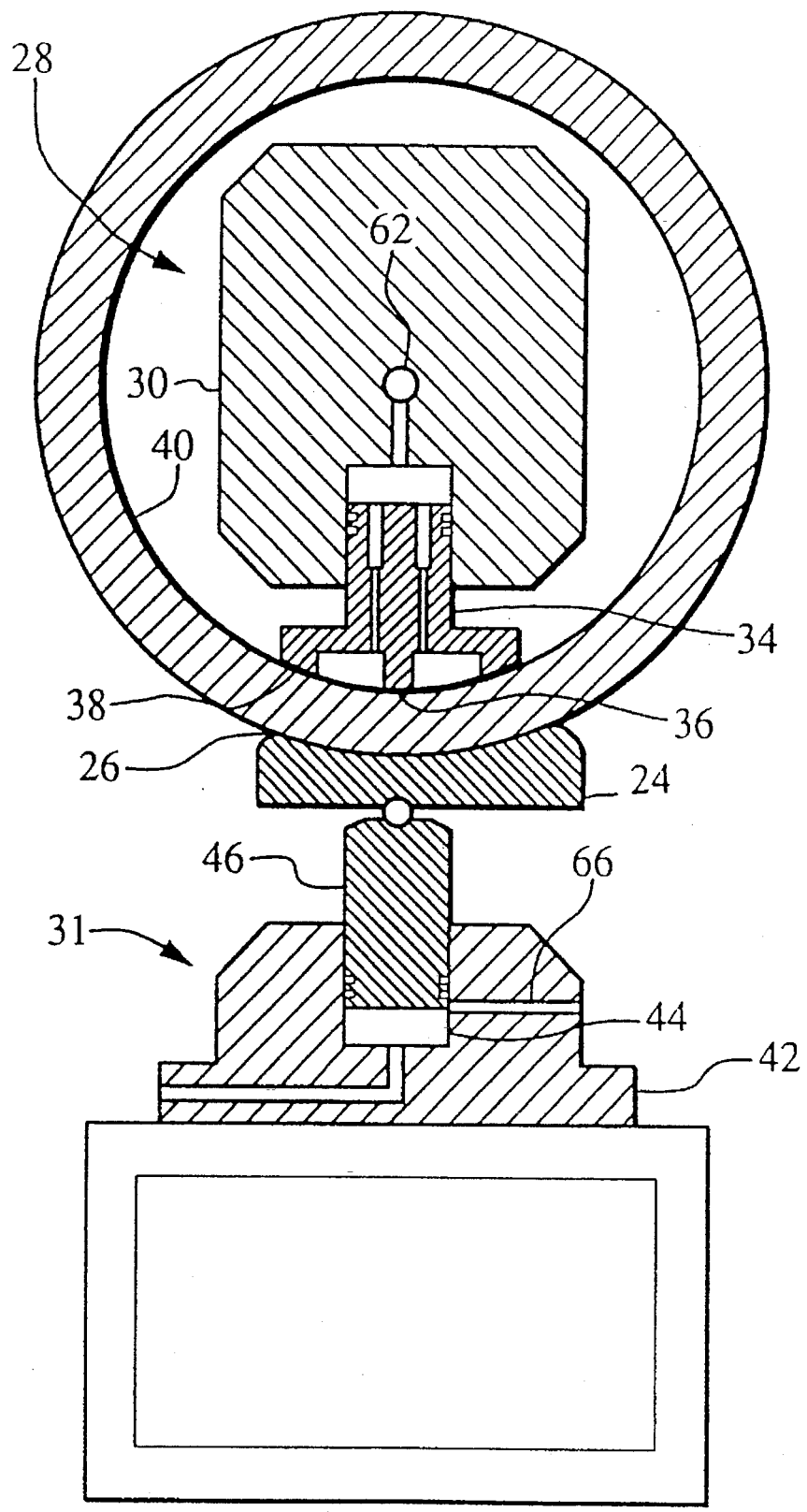
FIG. 4 is a somewhat schematic cross-sectional view of a self-loading crown support backing roll and extended nip press of the present invention in which the shoe blanket and felt have been left out for clarity.

FIG. 4 shows how a port 66 can be used to apply the same principle to stabilize an extended nip press employing an extended nip shoe 24 in engagement with a backing roll 22 which employs a crown control system 28.

Figure 5:
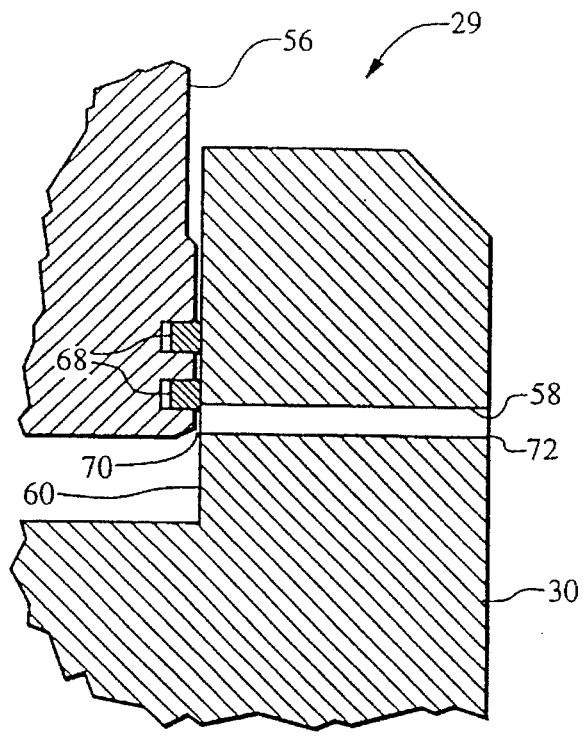
FIG. 5 is a detailed cross-sectional view of a prior art position control hydraulic system.

FIG. 5 shows the operation of the port 58 in detail where the cylinder 60 is sealed around the piston 56 by piston rings 68. The inlet opening 70 to the port 58 is shown partly uncovered by the piston 56 so that hydraulic fluid may now begin to leak through the port 58 to a low pressure vent area 72.

Figure 6:
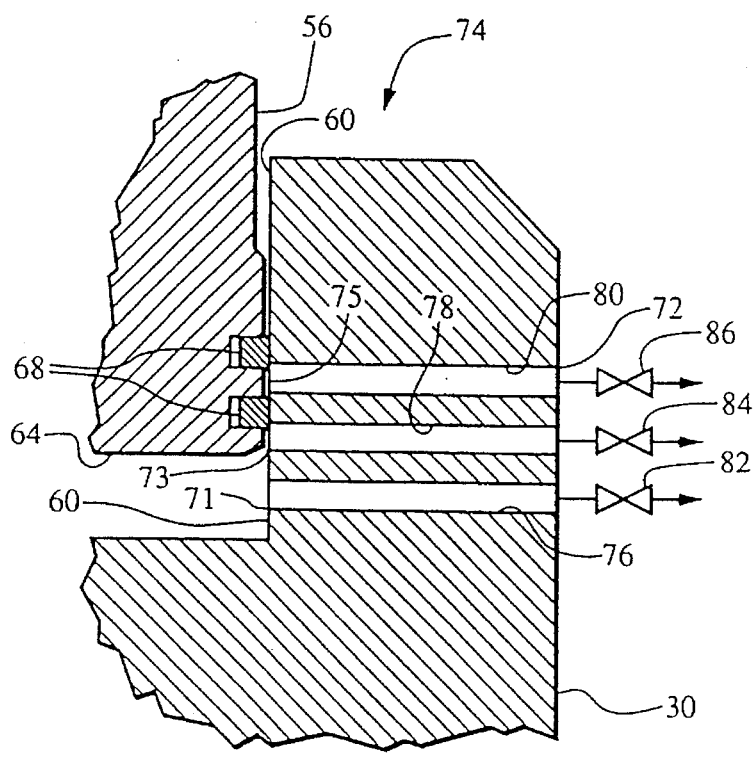
FIG. 6 is a detailed cross-sectional view of the hydraulic control system of this invention with discrete control points.

FIG. 6 shows an improved, stabilized crown support system 74 which employs three ports: a first port 80, a second port 78, and a third port 76. The ports 76, 78, 80 are each controlled by a valve 82, 84, 86 respectively. The position of the piston 56 can then be controlled by opening the valves 82, 84, 86, in which case the piston 56 will assume a position no higher than the entrance 71 of the lower port 76. Upon closing the lower valve 82, the piston 56 will now be free to move upwardly until the lower face 64 is positioned as shown next to the middle opening 73 of middle port 78. Upon closing the middle valve 84 the piston 56 may move to a position adjacent to the upper opening 75 of the upper port 80. If the upper valve 86 were also closed, the piston would now act similar to system 28 shown in FIG. 2.

Figure 7:
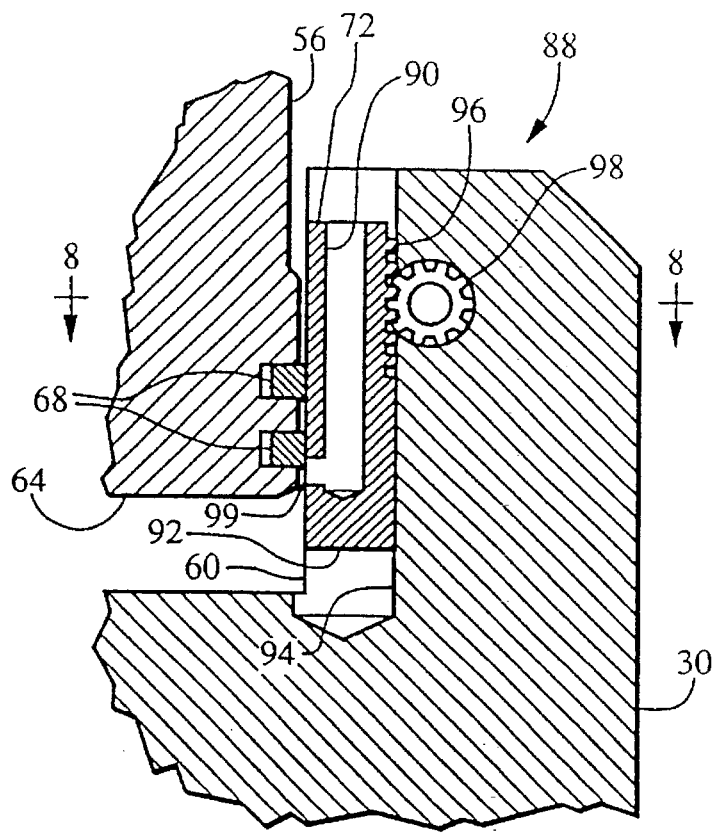
FIG. 7 is a detailed cross-sectional view of a vertically adjustable crown support piston control system of FIG. 8 taken along section line 7—7.
Figure 8:
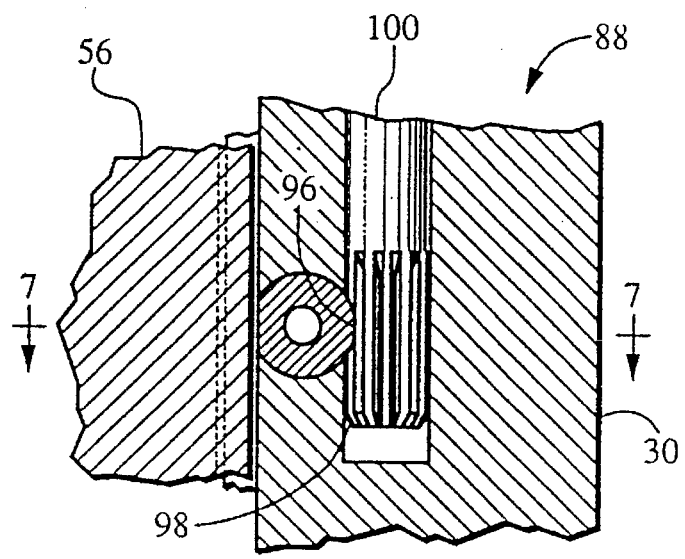
FIG. 8 is a plan cross-sectional view of the position control system of FIG. 7 taken along section line 8—8.

The position control system 74 shown in FIG. 6 provides discrete adjustability. If continuous adjustability is required or desirable, the piston control system 88, as shown in FIGS. 7 and 8, may be employed. Here, a port 90 extends centrally through a moveable conduit piston 92. The conduit piston 92 moves in a cylinder 94 which is adjacent to and opens into the crown control cylinder 60. The conduit piston 92 has a rack 96 formed into one side. A pinion gear 98 mounted within the cross head 30 engages the rack 96. The pinion gear 98 is mounted on a control shaft 100, as best shown in FIG. 8, which may be rotated to raise and lower the venting port entrance 99. Movement of the entrance port 99 in turn will control the maximum position of the piston 56 in FIG. 7.

It should be understood that the rack and pinion control system 88 shown in FIG. 7 could be used to support a shoe of an extended nip press.

It should also be understood that the multiple port system 74, and the rack and pinion port system 88 could be used to control individual, circular hydraulic pistons, or could be used to control a single long, linear piston used to support a roll or an extended nip shoe.

It should also be understood that the adjustable port system 88 is not limited to the rack and pinion gear system shown, but could employ other mechanical or electrical means for positioning the port 90 and its opening 99 with respect to the piston 56.

It should also be understood that in the preferred embodiment, in order to avoid deflection of the backing roll 22, the end supports will allow vertical movement so that the roll as a whole may translate in response to the crown control systems disclosed herein.

It should also be understood the invention is not confined to the particular construction and arrangement of parts herein illustrated and described, but embraces such modified forms thereof as come within the scope of the following claims.

I claim:

1. In a papermaking machine having a first cylindrical roll and a nip member supported on a stationary cross head, wherein the nip member engages a paper web between the first cylindrical roll and the nip member, defining a nip therebetween, and a piston mounted within a piston cavity formed in the cross head which is operable to move in a nipwad direction toward and away from the nip, the improvement comprising:

a first port extending from the piston cavity through the cross head;

a second port extending from the piston cavity through the cross head, wherein the second port is spaced form the first port away from the nip; and a valve which is operable to selectively block the first port, wherein hydraulic fluid introduced into the piston cavity may escape from the piston cavity to a low pressure vent area through either the first or the second port depending on the state of the valve when the piston is positioned within the cavity so as to uncover said first or second port, such that the piston may be advanced nipward a limited amount in response to the introduction of hydraulic fluid into the piston cavity.

2. The apparatus of claim 1 further comprising a plurality of piston cavities formed in the cross head, and a plurality of pistons extending therefrom wherein each piston cavity has a first port and a second port formed therein, and a valve which is operable to selectively block the first port.

3. The apparatus of claim 1 further comprising:

at least one additional port extending from the piston cavity through the cross head, wherein each additional port is spaced from the second port away from the nip; and a second valve which is operable to selectively block the second port to provide selected venting of hydraulic fluid so the piston can not extend toward the nip further than the position determined by the selected port.

4. The apparatus of claim 1 wherein the nip member comprises a second cylindrical roll rotatable about the stationary cross head which forms the nip with the first roll.

5. The apparatus of claim 1 wherein the nip member is a concave shoe which forms an extended nip with the first roll.

6. In a papermaking machine having a first cylindrical roll and a nip member supported on a stationary cross head, wherein the nip member engages a paper web between the first cylindrical roll and the nip member, defining a nip therebetween, and a piston mounted within a piston cavity formed in the cross head which is operable to move in a nipward direction toward and away from the nip, the improvement comprising:

a first port extending from the piston cavity through the cross head; and a second port extending from the piston cavity through the cross head, wherein the second port is spaced axially along the cross head form the first port, wherein hydraulic fluid introduced into the piston cavity may escape from the piston cavity to a low pressure vent area through either the first or the second port, when uncovered by the piston, and wherein the piston may be advanced nipward a limited mount in response to the introduction of hydraulic fluid into the piston cavity so the piston in proximity to a port can not move further in a nipward direction than the position determined by said port.

7. The apparatus of claim 6 wherein the nip member comprises a second cylindrical roll rotatable about the stationary cross head which forms the nip with the first roll.

8. The apparatus of claim 6 wherein the nip member is a concave shoe which forms an extended nip with the first roll.

* * * * *

UNITED STATES PATENT AND TRADEMARK OFFICE
CERTIFICATE OF CORRECTION

PATENT NO.   :   5,534,117
DATED        :   July 9, 1996
INVENTOR(S)  :   Arnold Roerig It is certified that error appears in the above-indentified patent and that said Letters Patent is hereby corrected as shown below:

Column 2, line 47:   "pods" should read --ports--.

Column 5, line 50:   "nipwad" should read --nipward--.

Signed and Sealed this

Sixth Day of May, 1997

Attest:

BRUCE LEHMAN

*Attesting Officer*              *Commissioner of Patents and Trademarks*